(12) United States Patent
Miftakhov

(10) Patent No.: US 11,749,818 B2
(45) Date of Patent: Sep. 5, 2023

(54) MULTI-STAGE TURBOCHARGING COMPRESSOR FOR FUEL CELL SYSTEMS

(71) Applicant: ZeroAvia, Inc., Hollister, CA (US)

(72) Inventor: Valery Miftakhov, San Carlos, CA (US)

(73) Assignee: ZeroAvia, Inc., Hollister, CA (US)

( * ) Notice: Subject to any disclaimer, the term of this patent is extended or adjusted under 35 U.S.C. 154(b) by 0 days.

(21) Appl. No.: 17/819,564

(22) Filed: Aug. 12, 2022

(65) Prior Publication Data

US 2023/0044056 A1 Feb. 9, 2023

Related U.S. Application Data

(63) Continuation of application No. 16/798,281, filed on Feb. 21, 2020, now Pat. No. 11,444,295.
(Continued)

(51) Int. Cl.
*H01M 8/04* (2016.01)
*H01M 8/04111* (2016.01)
(Continued)

(52) U.S. Cl.
CPC ......... *H01M 8/04111* (2013.01); *B64D 33/02* (2013.01); *F02C 1/02* (2013.01);
(Continued)

(58) Field of Classification Search
CPC ......... H01M 8/04111; H01M 8/04201; H01M 2250/20; F05D 2220/323; B64D 2041/005
(Continued)

(56) References Cited

U.S. PATENT DOCUMENTS

| 3,801,372 A | 4/1974 | Shaw |
| 5,106,035 A | 4/1992 | Langford |

(Continued)

FOREIGN PATENT DOCUMENTS

| DE | 19821952 A1 | 11/1999 |
| EP | 2600015 A1 | 6/2013 |
| EP | 2979731 A1 | 2/2016 |

OTHER PUBLICATIONS

Thomas, et al., "Fuel Cells—Green Power", https://paginas.fe.up.pt/~mcnunes/QAE/documentos/fuelcells.pdf, Nov. 29, 2007, 1-36.

*Primary Examiner* — James M Erwin

(57) ABSTRACT

An aircraft power plant for a fuel cell including a turbo assembly, a compressor assembly, a turbo assembly, a compressor assembly controller, a first stage turbo assembly and compressor assembly operation configured to generate a first stage compressed fluid generated from ambient air and excess oxygen exhausted from a fuel cell of an aircraft power plant. A second stage turbo assembly and compressor assembly operation configured to receive the first stage compressed fluid, and a controller bleed valve coupled with the first stage turbo assembly and compressor assembly and the second stage turbo assembly and compressor assembly. An oxygen supply system, the oxygen supply system fluidically coupled with the first stage turbo assembly and compressor assembly wherein a first compressed oxygen is generated by the first stage turbo assembly is combined with a second compressed oxygen generated by the second stage turbo assembly to generate a combined oxygen controlled by the controller bleed valve. A third stage turbo assembly and compressor assembly operation configured to receive the combined oxygen, and a hydrogen supply system configured to provide hydrogen fluidically coupled with the third stage turbo assembly and compressor assembly.

1 Claim, 4 Drawing Sheets

Related U.S. Application Data

(60) Provisional application No. 62/808,308, filed on Feb. 21, 2019.

(51) Int. Cl.

| | | |
|---|---|---|
| *F02C 1/02* | (2006.01) | |
| *H01M 8/04082* | (2016.01) | |
| *F02C 6/18* | (2006.01) | |
| *F02C 7/36* | (2006.01) | |
| *B64D 33/02* | (2006.01) | |
| *B64D 31/00* | (2006.01) | |
| *B64D 41/00* | (2006.01) | |

(52) U.S. Cl.
CPC ............ *F02C 6/18* (2013.01); *F02C 7/36* (2013.01); *H01M 8/04201* (2013.01); *B64D 31/00* (2013.01); *B64D 2033/024* (2013.01); *B64D 2033/0266* (2013.01); *B64D 2041/005* (2013.01); *F05D 2220/323* (2013.01); *F05D 2220/60* (2013.01); *F05D 2260/211* (2013.01); *H01M 2250/20* (2013.01)

(58) Field of Classification Search
USPC .......................................................... 429/444
See application file for complete search history.

(56) References Cited

U.S. PATENT DOCUMENTS

| | | |
|---|---|---|
| 5,810,284 A | 9/1998 | Hibbs et al. |
| 6,119,979 A | 9/2000 | Lee et al. |
| 6,322,915 B1 | 11/2001 | Collins et al. |
| 6,568,633 B2 | 5/2003 | Dunn |
| 11,411,236 B2 | 8/2022 | Miftakhov et al. |
| 2001/0018138 A1 | 8/2001 | Iwase |
| 2002/0005454 A1 | 1/2002 | MacCready et al. |
| 2012/0153076 A1* | 6/2012 | Burns .................. B64D 41/00 60/785 |
| 2019/0363381 A1 | 11/2019 | Haag et al. |
| 2020/0355117 A1 | 11/2020 | Miftakhov |

\* cited by examiner

MULTI-STAGE TURBOCHARGING COMPRESSOR FOR FUEL CELL SYSTEMS

CROSS-REFERENCE TO RELATED PATENT APPLICATIONS

This application claims priority to and benefit of co-pending U.S. patent application Ser. No. 16/798,281, filed on Feb. 21, 2020, entitled "MULTI-STAGE TURBOCHARGING COMPRESSOR FOR FUEL CELL SYSTEMS" by Valery Miftakhov, and assigned to the assignee of the present application, hereby incorporated by reference in its entirety.

U.S. Patent application claims priority to and benefit of then U.S. Provisional Patent Application 62/808,308 filed on Feb. 21, 2019, entitled "MULTI-STAGE TURBOCHARGING COMPRESSOR FOR FUEL CELL SYSTEMS" by Valery Miftakhov, and assigned to the assignee of the present application, the disclosure of which is hereby incorporated by reference in its entirety.

BACKGROUND OF THE INVENTION

Field of the Invention

The disclosed embodiments relate in general to clean energy-based air transportation systems technology, and, more specifically, to multi-stage turbocharging compressor for fuel cell systems.

Description of the Related Art in today's high-performance fuel cell systems, oxygen supply is one of the most serious performance bottlenecks. At high power output, a very significant amount of air needs to be supplied to the fuel cell—for example, in a representative 125 kW fuel cell system, over 500 kg of air needs to be supplied per hour at high pressure of 3 bars. The current state of the art in the industry is to use electric motor-driven compressors to provide such air flows. These compressors are extremely expensive and heavy, resulting in significant degradation of the overall system performance per unit of weight. They also often have limited life, reducing the overall system reliability and increasing maintenance costs.

SUMMARY OF THE INVENTION

The inventive methodology is directed to methods and systems that substantially obviate one or more of the above and other problems associated with conventional technology.

In accordance with one aspect of the embodiments described herein, there is provided an aircraft power plant comprising novel air management features for high-power fuel cell applications, the features combine supercharging and turbocharging elements with air and hydrogen gas pathways, utilize novel airflow concepts and provide for much stronger integration of various fuel cell drive components.

Additional aspects related to the invention will be set forth in part in the description which follows, and, in part, will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1:
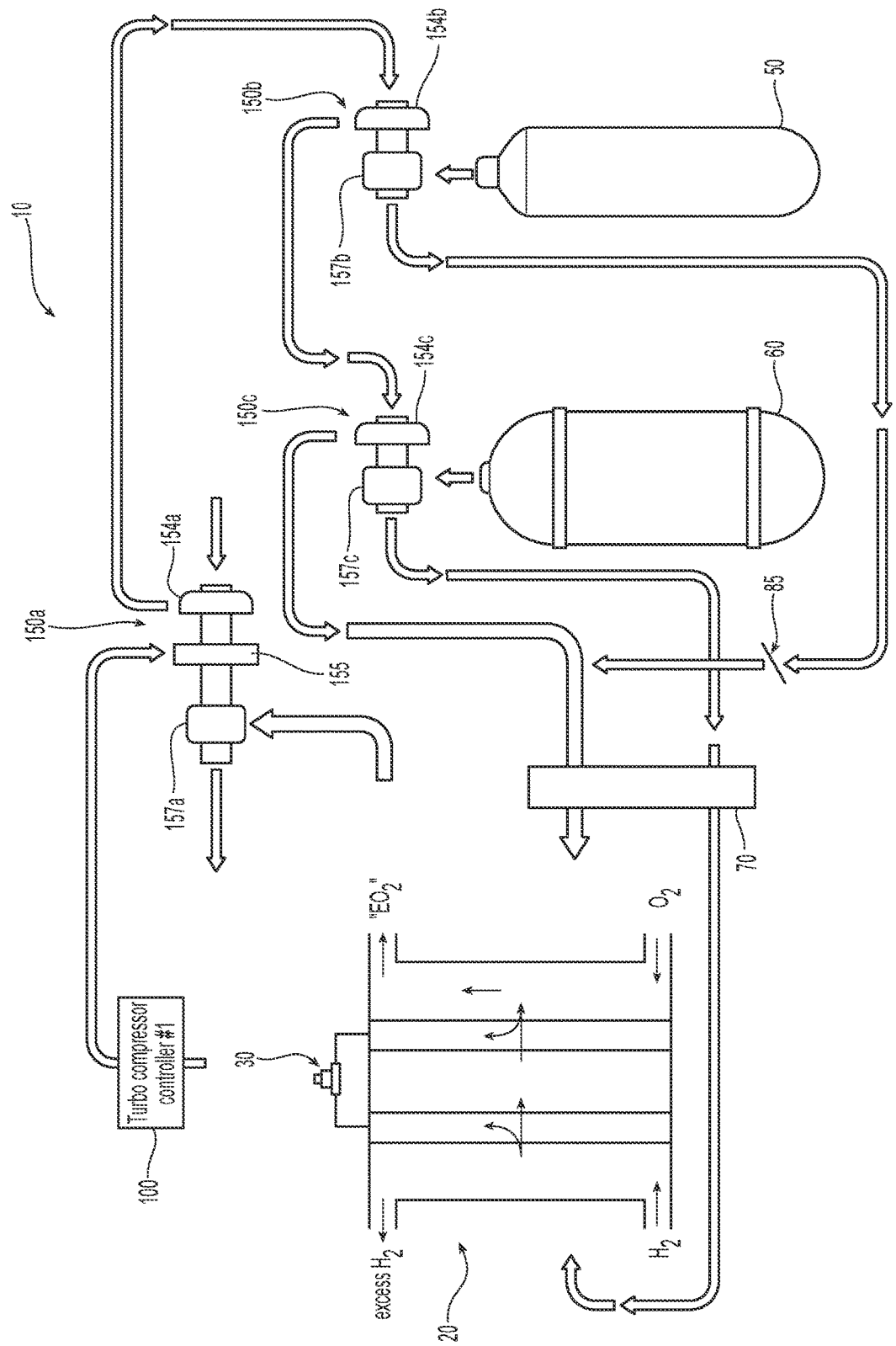
FIG. 1. Multiple energy sources to drive primary air compression.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

We propose a set of novel air management features for high-power fuel cell applications. These features combine supercharging and turbocharging elements with air and hydrogen gas pathways, utilize novel airflow concepts and provide for much stronger integration of various fuel cell drive components.

Specifically, we propose to utilize any combination of the following novel energy sources to drive a compressor shaft:

In one or more embodiments, compressed hydrogen gas from the main hydrogen storage system.

In one or more embodiments, compressed oxygen/air from the compressed air/oxygen storage system utilized for take-off assist (see a separate patent submission on that system for more details).

In one or more embodiments, compressed exhaust air coming out of the fuel cell system.

In one or more embodiments, waste heat energy, recovered via a variant of an Organic Rankine Cycle machine.

In one or more embodiments, an integrated electric motor is included providing additional mechanical power to assist the other energy sources.

In one or more embodiments, mechanical power is provided by a gearbox/pulley system attached to the primary propulsion electric motor[s] in the system.

In one or more embodiments, mechanical power is provided by the direct drive from the primary propulsion electric motor[s] in the system.

It is believed that these energy sources were generally never used before in fuel cell systems, and their applications may result in complete elimination of the requirement for a classic standalone electrically-driven compressor. Any combination of the energy sources described herein can be used in the final system design. For example, in one embodiment, the compressor may be implemented as a triple-stage turbocharger with electric assist, with one of the stages being fed from the fuel cell exhaust air "EA", the second stage being fed from a high-pressure oxygen supply 50, and the third stage being fed from a high-pressure hydrogen supply 60 (see FIG. 1).

The following discussion details specific applications of each of the energy sources mentioned above. Discussed below are four methods or systems to recover the compressed gas and waste heat energy:

In one or more embodiments, compressed hydrogen gas from the main hydrogen storage system.

In one or more embodiments, typically for the fuel cell systems, hydrogen is stored under high pressure up to 700 bar in composite compressed gas cylinders hydrogen supply 60 or up to 50 bar in liquid hydrogen tanks with boil-off (not shown).

At the same time, the fuel cell systems generally require low pressure hydrogen supply at below 10 bar.

In one or more embodiments, this pressure differential provides a significant amount of energy available for the turbocharger operation—utilizing high-pressure hydrogen to turn a turbine on one side of the turbocharger unit, which by the virtue of the direct shaft connection to the impeller-compressor turbine on the other side, compresses the air. This arrangement could dramatically reduce the amount of energy needed and total weight of the fuel cell air compressor system.

In one or more embodiments, such an arrangement could recover a significant amount of energy from the system 10. One way to estimate this is to look at the amount of energy typically required to compress hydrogen into a 700 bar cylinder pressure—various estimates between 10% and 15% (of the intrinsic H2 energy) exist, and then apply a typical round-trip efficiency of the compressed-gas energy storage—50%. This results in 5-7% additional recovery of the intrinsic energy, corresponding to 10-15% increase in potential mechanical/electrical output from the system (considering 50% typical efficiency of the fuel cell system). Another way to estimate the energy recovery is to apply standard turbo-expander analysis, which similarly results in ~10% additional mechanical/electrical energy output.

In one or more embodiments, compressed oxygen/air from the compressed air/oxygen storage supply (not shown) is utilized for take-off assist. Another embodiment of this system 10 could include an on-board compressed oxygen cylinder 50 that not only could provide additional energy source for the multi-scroll/multi-stage turbocharger, but also reduce the overall performance requirements for the air compressor 100 by providing part of the required oxygen from the onboard source. The overall system 10 can be designed to optimize the sizes of all components (including the amount of oxygen storage and pressure) to achieve the maximum gravimetric efficiency of the entire powertrain for a given mission profile—maximum kW/kg for a given mechanical energy output and partial pressure of ambient oxygen available.

In one or more embodiments, a separate ZeroAvia patent submission on this "Oxygen/Air Booster System" provides additional details. For this discussion, it is sufficient to note that it entails an addition of the high-pressure air/oxygen supply tank 50 onboard the aircraft. In one embodiment of that invention, the supplemental air is stored at 700 bar.

Similar to the case with compressed hydrogen supply 60, the stored oxygen is used at a much lower pressure of 2-3 bars.

In one or more embodiments, this pressure differential provides a significant amount of energy available for the turbocharger operation, which could dramatically reduce the amount of energy needed and total weight of the fuel cell air compressor 100.

In one or more embodiments, similar to the system recovering energy from compressed hydrogen, a compressed air/oxygen energy recovery system can recover a significant amount of energy. In fact, due to higher density of air/oxygen, such a system can recover energy at higher power levels. Specifically, standard turbo-expander analysis results in up to 20% additional mechanical/electrical power boost from such a system. Considering an existing benefit of compressed air/oxygen to provide the power boost during the take-off/go-around phases of flight (described in a separate patent application from ZeroAvia), the energy recovery described herein further increases the net power benefit of such a system, making it a virtual necessity to integrate such a system into any high-performance aviation powertrain.

The system of FIG. 1 is described as follows: A turbo compressor controller 100 drives a turbo 154*a* and compressor 157*a* assembly 150*a* to compress a first amount of air supplied from ambient air and from the excess oxygen (EO2) exhaust from the fuel cell 20. The compressed air from the Stage 1 compression is typically greater than 1 bar. This Stage 1 air is fed into a turbo 154*b* and compressor assembly 157*b* along with oxygen (O2) from oxygen supply 50. Compressed oxygen (O2) exits the turbo 154*b* under Stage 2 compression which is typically greater than 2 bars. Compressed oxygen (O2) also exits the compressor 157*b* and is combined with compressed oxygen (O2) exiting Stage 3 controlled by a bleed valve 85.

Stage 2 compressed oxygen (O2) is fed into a turbo 154*c* and compressor 157*c* assembly 150*c* along with hydrogen (H2) from hydrogen supply 60. Compressed oxygen (O2) exits the turbo 154*c* under Stage 3 compression which is typically greater than 3 bars and combines with the Oxygen from Stage 2 to feed the cathode (O2) side of the fuel cell 20. Compressed Hydrogen (H2) exits the compressor 157*c* and feeds the anode (H2) side of the fuel cell 20. The compressed hydrogen (H2) and compressed oxygen (O2) may be fed through an intercooler 70 prior to introduction into the fuel cell 20. Compressed exhaust air (EO2) coming out of the fuel cell 20 is recycled to the turbo 154*a* and compressor 157*a* assembly 150*a*.

Typically, a fuel cell system is only mildly pressurized to enable positive air and hydrogen flows through the stack.

In one or more embodiments, for our high-power airborne fuel cell system, we propose significantly higher pressurization of the stack, which allows us to increase the amount of reagents (oxygen and hydrogen) that reach the active reaction surfaces of the catalytic membrane, and therefore produce higher power from the same unit.

In one or more embodiments, these higher pressures mean that there is a stronger pressure differential between the fuel cell stack and the ambient pressure—especially at the high altitudes of aircraft operation. This differential pressure can provide a source of energy that can be used to assist primary air compression. In this invention, the controllable back-pressure turbine 155 is added to the exhaust of the fuel cell stack, allowing the ability to both control the stack pressure and extract any useful energy from the pressure differential to use in primary propulsion. Such back-pressure turbine 155 can be coupled to the electric motor-generator to generate additional electricity while maintaining regulated back-pressure in the stack, further increasing the efficiency of the full system 10.

Figure 4:
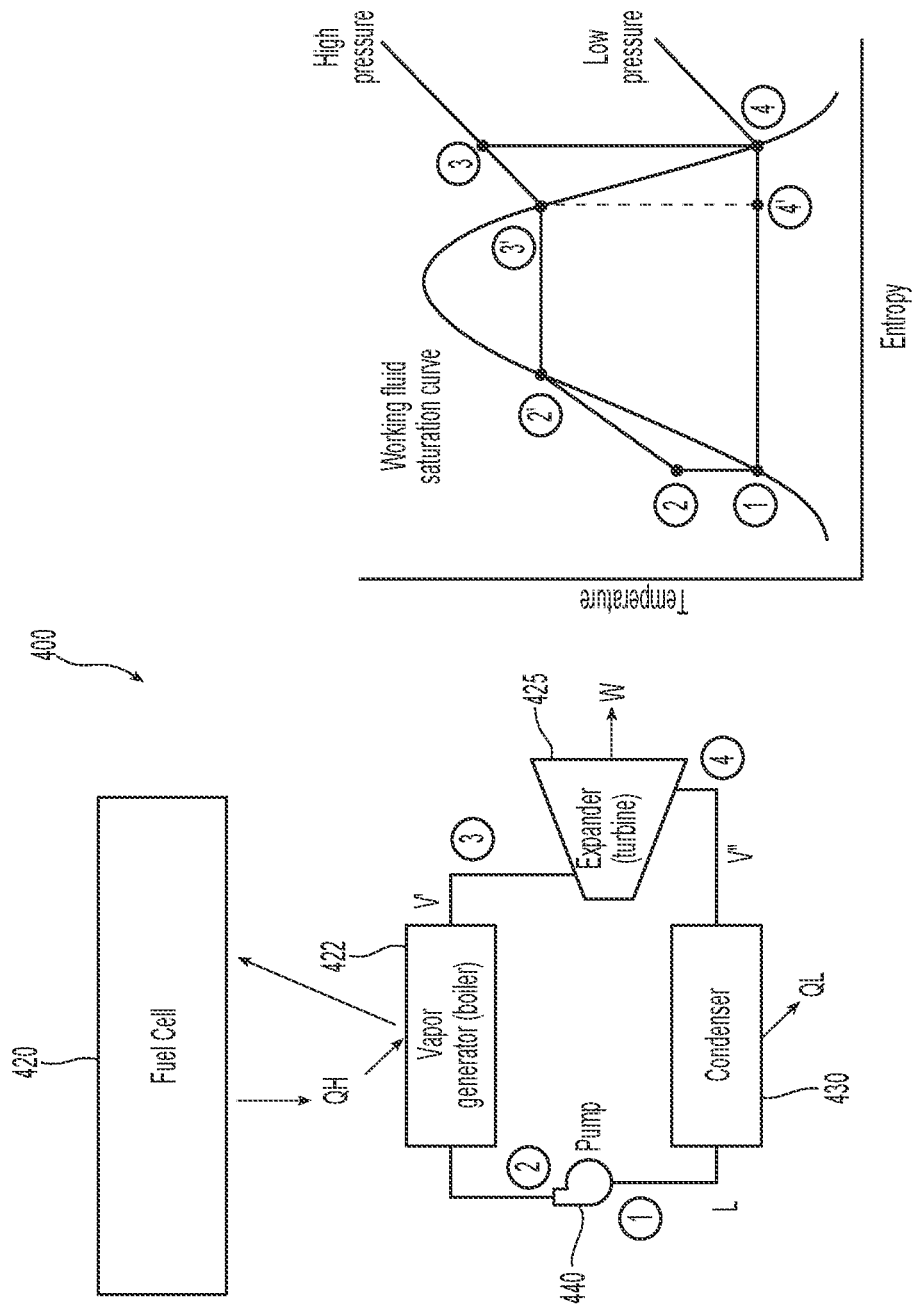
FIG. 4. Rankine Cycle application to energy recovery from the fuel cell system.

In another system, shown in FIG. 4, waste heat energy QH is recovered via a closed-loop Rankine Cycle power turbine system 400, built around the fuel cell system 400 including a fuel cell 420 (FIG. 4). The waste heat QH from the fuel cell stack 420 heats up a working fluid in a boiler 422, converting it into superheated vapor V', which then turns a turbine 425. The mechanical power W from the turbine 425 is then used to assist primary air compression. The post-turbine 425 lower-temperature/lower-pressure vapor V" gets further cooled by a heat exchanger (condenser) 430 thermally connected to the outside air QL, which condenses the lower-pressure vapor V" back into the liquid L. Finally, the liquid L is pumped through the loop again via a small pump 440 (electrically or mechanically driven).

Selection of the working fluid for the Rankine Cycle is generally based on the temperatures present in the system 400. In our case, the working temperature of the Fuel cell 420 is 80-90° C., while the ambient temperature is generally less than 0° C. at cruising speed and at altitudes above 10,000 feet. One of the good candidate fluids for this temperature range is a commonly used air conditioning agent, R134a. Other fluids can be used, as well.

In one or more embodiments, with a properly configured Rankine Cycle (mainly the correct working superheated vapor pressure), one can achieve up to 10% energy recovery from the waste heat created by the fuel cell system 400. Considering that a typical fuel cell system 400 is ~50% efficient at the useful range of power outputs, meaning that 10% energy recovery from waste heat would translate into a 5% absolute efficiency increase, allowing to reach net efficiency of 55% in this example. Such an increase is very significant for any fuel cell application In one or more embodiments, an added benefit of using the energy of compressed gases is that the post-turbine gas will have a significantly lower temperature compared to the pre-turbine gas. This enables use of such cool gases in a combination of heat exchangers that can help reduce the external cooling requirements for the system. Thermal management of the fuel cell systems is one of the most challenging problems in fuel cell applications, and such assistance is very welcome.

Another advantage of utilizing energy of stored compressed gases (hydrogen, oxygen/air) is that you can utilize the available gas energy to jump-start the system without any need for external electrical power.

Additionally, any of the above methods can also be applied to generate additional mechanical/electrical output from the system, instead or in addition to utilizing the recovered energy to assist air compression.

We now move to the discussion of the novel methods to mechanically drive the compressor system—we propose the following three methods:

An integrated electric motor providing additional mechanical power to assist the other energy sources.

An electric motor, e.g, 320, can be integrated with one or more turbines from any of the systems, e.g., 300, discussed above and below.

Such an electric motor 320 can be used to supply additional mechanical power to help turn the corresponding compressor turbine, e.g., 334.

Such a motor e.g., 334, can also be used as a generator to extract electrical power in case the amount of mechanical power created by the above compressed-gas subsystems exceeds the amount of power needed to provide necessary primary air compression. In such a case, this excess electrical energy can be used to recharge the primary aircraft battery and help run the various onboard electrical components, increasing the overall efficiency and range of the aircraft.

A separate or integrated electronic controller 100 is proposed to manage such a bi-directional motor-generator 155 (or 355 discussed below) to achieve maximum system benefit.

In another proposed embodiment, mechanical power is provided by a gearbox/pulley system 200 attached to the primary propulsion electric motor[s] 220 in the system 200.

In one or more embodiments, an aircraft powertrain 205, unlike a typical automotive powertrain, generally operates at fixed rotational speed (RPM). This creates a much more constant mechanical power supply to run various loads, including air compressors.

Figure 2:
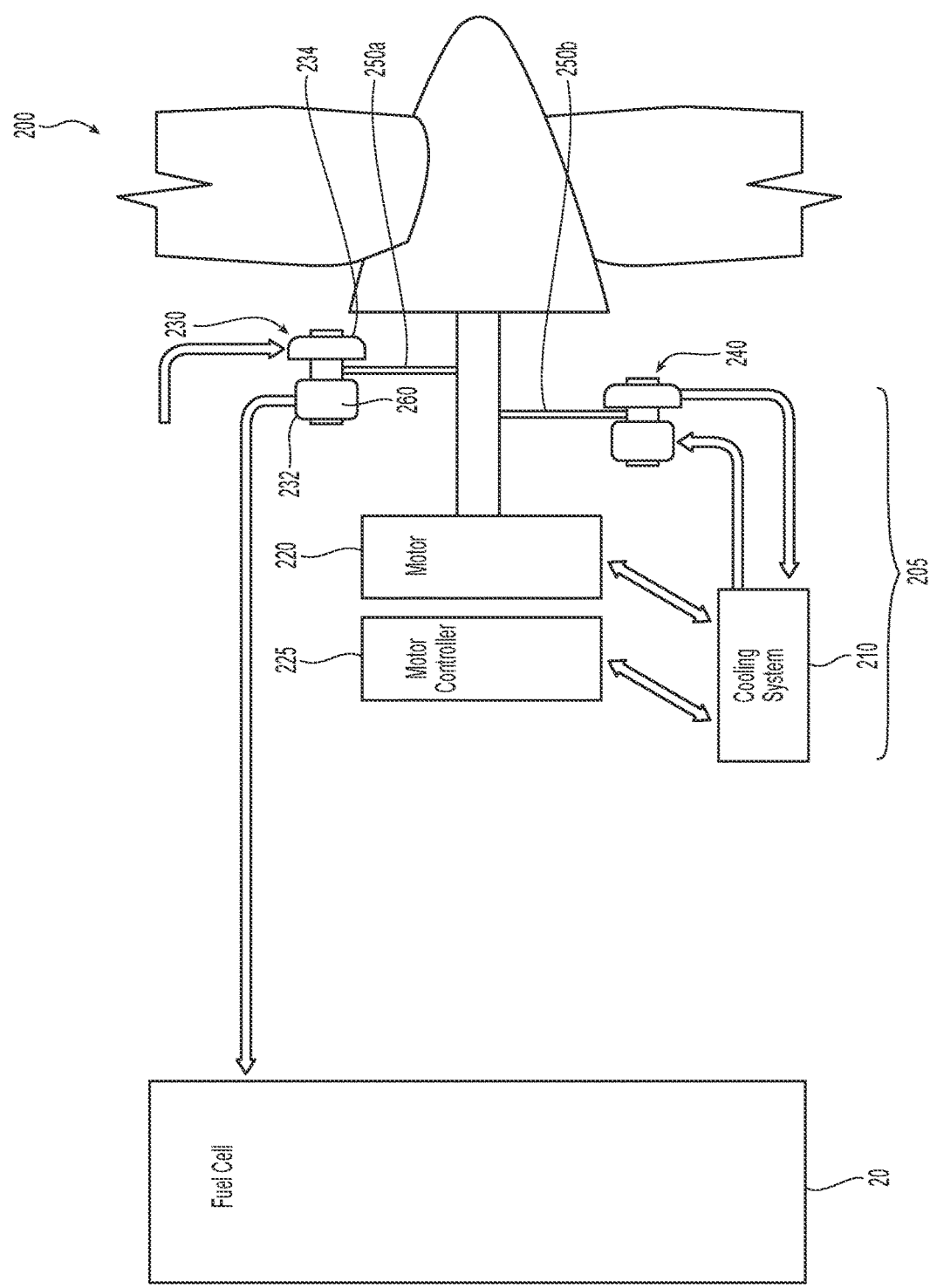
FIG. 2. Shaft-powered compressor turbines for air compression and coolant pumps.

Gearbox/pulley system 200 of FIG. 2 replaces electric motors in traditional compressor units with a mechanical drive linked to the primary motor 220 via a mechanical coupling 250$a$, 250$b$, e.g., a belt drive or a simple gearbox—to match the rotational speed of the primary propulsive motor 220 with the required RPM for the operation of the turbine 234.

As the rotational speed of the compressor turbine 234 is now largely fixed due to a relatively constant propulsive drive RPM and a fixed transmission ratio of the belt/gear drive, a separate controller 225 needs to be added to control the compression level post-turbine. This can be accomplished by the addition of the controllable wastegate (not shown) that opens into ambient air at a certain pressure that is set by a dedicated controller 225 circuit and software.

Figure 3:
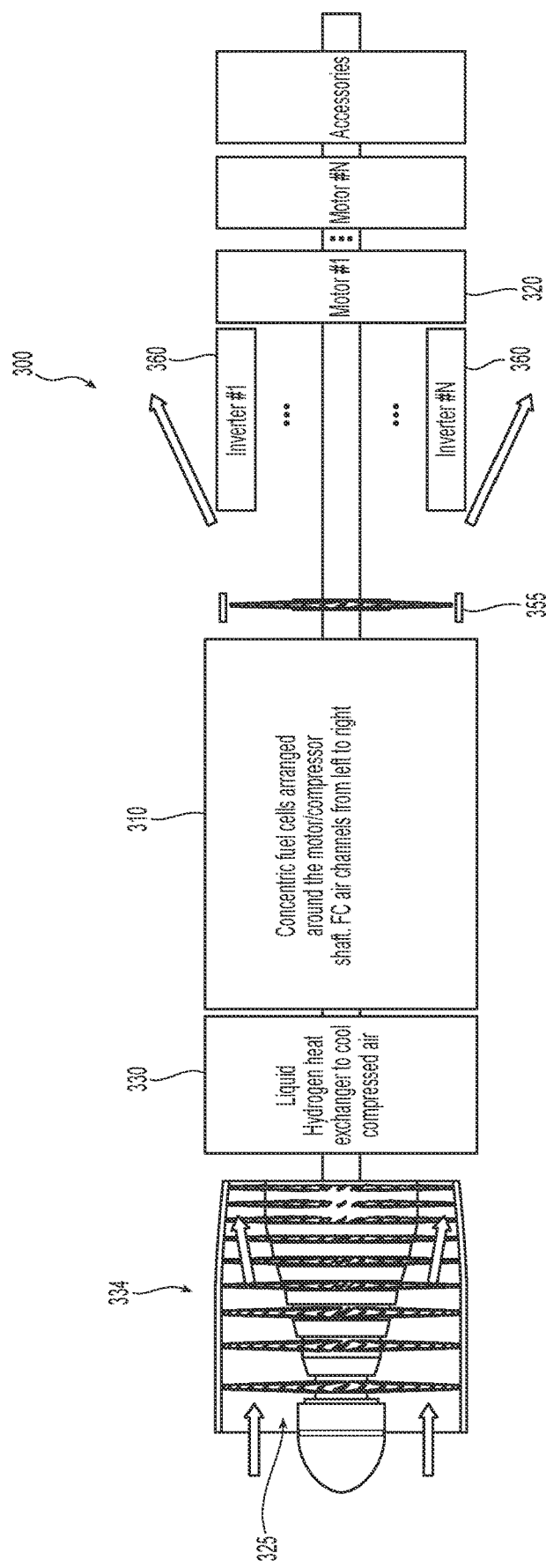
FIG. 3. Advanced compressor component integration (a TurboCell Aircraft Engine).

In another proposed embodiment shown in FIG. 3, mechanical power may be provided by the direct drive system 300 from the primary propulsion electric motor[s] 320 in the system 300.

Similar to the previous embodiment where the primary propulsion motor 220 powers the compressor turbine 234 via a belt/gear driven transmission, this system 300 uses the primary propulsion motor 320, as well. However, in this case, the compressor turbine/impeller 325 is mounted directly on the main propulsion motor shaft 328, and rotates at the same RPM as the main shaft 328 of the motor 320.

This allows for significant simplification of the mechanical drive but requires custom design of the compressor turbine 334 to efficiently operate at a lower RPM of the primary drive motor 320 (generally 1,600-6,000 RPM, depending on the design of the primary drive itself).

A traditional way to accomplish this could be utilizing a larger single impeller/turbine 325, similar in size with the motor diameter (e.g., 40 cm diameter turbine in one of the embodiments that utilizes EMRAX 348 or YASA 750R motor sets).

An alternate novel approach would be to utilize a staged axial compressor system (not shown) similar to the ones used in aircraft turbine engines, mounted on the same shaft. Such an approach allows for higher efficiency of compression, higher potential compression ratios, streamlined airflow, and better packaging of the entire powertrain.

In one or more embodiments, to take further advantage of such packaging approach, we also propose to place a heat exchanger 330 in line with one or more post-turbine cool gas sources described above (or a cool hydrogen source taken immediately from the boil-off of the liquid hydrogen tanks onboard the aircraft). This heat exchanger 330 would perform a dual task of heating up the cool gas to working temperatures, and at the same time cooling the compressed air to its respective working temperature. Liquid hydrogen of very cool hydrogen gas can also be used to cool the superconducting motor assembly in some embodiments.

In one or more embodiments, to take even further advantage of such packaging approach, the fuel cell stack 310 itself can be arranged in the concentric layers, allowing streamlined flow of compressed air through the 'engine core', similar to how a traditional jet turbine engine flows the air axially into the combustion chamber.

Finally, an additional turbine stage with variable vanes, a variable-torque integrated motor-generator, or variable wastegate valves can be placed after the fuel cell stack 310 to control the back-pressure in the fuel cell stack output, e.g., back pressure turbine 355.

The rest of the powertrain (motors 320, inverters 360, etc.) can be similarly integrated on one primary shaft 328 that drives the main propulsive element (a propeller, a fan, etc.)—directly or via an additional primary gearbox.

Specific implementation details—examples of potential components.

Turbine-impeller cores with air bearings (to avoid contamination of the fuel cell reagents with oil products: Precision Turbo GEN2 PT6266 or PT6466. Can be used for hydrogen, oxygen/air, and exhaust flows.

Integrated motor-generator and controller to control back-pressure or provide regeneration capability for a turbo-charged motor: AerisTech AES802C supercharge motor-generator with controller.

Rankine Cycle system discussed above can be created using a combination of relatively standard evaporators, heat exchanges, and pumps traditionally used in automotive air conditioning systems. The temperatures of the hot and cold side in aviation applications we are targeting match some of the standard refrigerant fluids well—for example R134a, R245fa, or Iso-Butane can all be used.

An example of fuel cells that could be shaped into the concentrically aligned stack include: (a) any air cooled PEM cells, (b) any liquid cooled PEM cells—e.g., ones using metal bipolar plate-based systems like the ones from Intelligent Energy (UK), Powercell (Sweden), Horizon Fuel Cell (China), etc.

A shaft-mounted impeller/compressor may be of a classic impeller turbine design similar to those of the standard automotive compressors such as the abovementioned Precision Turbo GEN2 PT6266 units, scaled to the appropriate dimensions to provide the required air flow and match to the slower rotational speed of the main shaft.

Axial compressor stages can be implemented using a design similar to the axial compressor of common aircraft turbine engines such as Pratt & Whitney PT6 turbine engine family, Honeywell TPE331, etc.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive.

Moreover, other implementations of the invention will be apparent to those skilled in the art from consideration of the specification and practice of the invention disclosed herein. Various aspects and/or components of the described embodiments may be used singly or in any combination in aircraft power plants. It is intended that the specification and examples be considered as exemplary only, with a true scope and spirit of the invention being indicated by the following claims.

What is claimed is:

1. An aircraft power plant for a fuel cell, said aircraft power plant comprising:
   a turbo assembly;
   a compressor assembly;
   a turbo assembly and compressor assembly controller coupled to said turbo assembly and said compressor assembly;
   a first stage turbo assembly and compressor assembly operation configured to generate a first stage compressed fluid, said first stage compressed fluid generated from at least one of ambient air and excess oxygen exhausted from said fuel cell of said aircraft power plant;
   a second stage turbo assembly and compressor assembly operation configured to receive said first stage compressed fluid;
   a controller bleed valve coupled with said first stage turbo assembly and compressor assembly and said second stage turbo assembly and compressor assembly
   an oxygen supply system, said oxygen supply system fluidically coupled with said first stage turbo assembly and compressor assembly wherein a first compressed oxygen is generated by said first stage turbo assembly is combined with a second compressed oxygen generated by said second stage turbo assembly to generate a combined oxygen, generation of said combined oxygen controlled by said controller bleed valve;
   a third stage turbo assembly and compressor assembly operation configured to receive said combined oxygen; and
   a hydrogen supply system configured to provide hydrogen, said hydrogen supply system fluidically coupled with said third stage turbo assembly and compressor assembly wherein said hydrogen is combined with said combined oxygen.

\* \* \* \* \*